United States Patent [19]
Van Kesteren et al.

[11] Patent Number: 5,756,202
[45] Date of Patent: May 26, 1998

[54] MAGNETIC-OPTICAL RECORDING MEDIUM

[75] Inventors: Hans W. Van Kesteren; Auke-Jan Mud; Johannes M. Kerkhof, all of Eindhoven, Netherlands

[73] Assignee: U.S. Philips Corporation, New York, N.Y.

[21] Appl. No.: 816,464

[22] Filed: Mar. 13, 1997

Related U.S. Application Data

[63] Continuation of Ser. No. 284,880, Aug. 2, 1994, abandoned.

[30] Foreign Application Priority Data

Aug. 4, 1993 [EP] European Pat. Off. .............. 93202295

[51] Int. Cl.$^6$ ...................................................... G11B 5/66
[52] U.S. Cl. .................. 428/332; 428/336; 428/694 ML; 428/694 SC; 428/694 DE; 428/694 MT; 428/694 RE; 428/694 MM; 428/694 EC; 428/694 IS; 428/900
[58] Field of Search ............... 428/694 ML, 694 SC, 428/694 DE, 694 MT, 694 RE, 694 MM, 694 EC, 694 TS, 332, 336, 900

[56] References Cited

U.S. PATENT DOCUMENTS 4,789,600   12/1988   Yamada ........................... 428/694 ML

FOREIGN PATENT DOCUMENTS

| | | |
|---|---|---|
| 0304873 | 3/1989 | European Pat. Off. . |
| 273636 | 11/1987 | Japan . |
| 2077065 | 12/1981 | United Kingdom . |

OTHER PUBLICATIONS

"Hysteresis, Microstructure, and Magneto–Optical Recording in CO/PT and CO/PD Multilayers" W.B. Zeper et al. J. Appl. Phys. 70 (4) pp. 2264–2271, Aug. 15, 1991.

"CO/NI Multilayers with Perpendicular Magnetic Anisotrphy: Kerr Effect and Thermomagnetic Writing" F.J.A. De Broeder et al, Appl. Phys. Lett. 61 (12) pp. 1468–1470, Sep. 21, 1992.

Antiferromagnetic Coupling Between CO/NI Multilayers with Perpendicular Magnetization across MBE–Grown CU(111)Layers, P.J.H. Bolemen et al, Journal of Magnetism and Magnetic Materials 116(1992) pp. 315–319.

*Primary Examiner*—Leszek Kiliman
*Attorney, Agent, or Firm*—Norman N. Spain

[57] ABSTRACT

Magneto-optical recording medium comprising a substrate and a recording multilayer, the recording multilayer having perpendicular magnetic anisotropy and comprising layers of a first kind, which are principally comprised of Co, alternately stacked with layers of a second kind, which comprise metal other than Co, successive layers of the first kind being ferromagnetically coupled across interposed layers of the second kind, whereby at least one of the layers of the second kind which is bounded on both sides by layers of the first kind is substituted by a coupling structure comprising at least one layer of antiferromagnetic coupling material, across which coupling structure the immediately adjacent layers of the first kind are antiferromagnetically coupled. Such a magneto-optical recording medium is suitable for super-resolution data storage and retrieval, and for a direct overwrite procedure which does not involve magnetic field modulation.

15 Claims, 3 Drawing Sheets

MAGNETIC-OPTICAL RECORDING MEDIUM

This is a continuation of application Ser. No. 08/284,880, filed Aug. 4, 1994, now abandoned.

The invention relates to a magneto-optical recording medium comprising a substrate and a recording multilayer, the recording multilayer having a magnetic easy axis perpendicular to the multilayer and comprising layers of a first kind alternately stacked with layers of a second kind, the layers of the first kind being principally comprised of Co and the layers of the second kind comprising a metal other than Co, whereby successive layers of the first kind are ferromagnetically coupled across interposed layers of the second kind.

In a magneto-optical recording medium having a recording multilayer with perpendicular magnetic anisotropy, individual data bits are represented by domains which are magnetised in one of the two different orientations perpendicular to the multilayer. Such data bits can be detected via magneto-optical effects, whereby the polarisation state of polarised light incident on the multilayer (e.g. from a laser) is changed in a manner which depends on the direction and magnitude of the magnetisation in that part of the multilayer impinged upon by the light. Such changes in polarisation state can be monitored in the light reflected from the multilayer (Kerr effect) or in the light transmitted through the multilayer (Faraday effect).

The magnetised domains can be obtained by using a focused laser light beam to locally heat the recording multilayer to a temperature near the Curie temperature of the recording multilayer material. When the region of the recording multilayer thus heated is allowed to cool in an external magnetic field, the magnetisation in that region will align and lodge itself in the direction of that magnetic field. This procedure is referred to as thermomagnetic writing. A common means of thermomagnetically writing information in a recording multilayer is one whereby the recording medium is embodied in the form of a disc which rotates about an axis perpendicular to its plane, the data bits being written in the recording multilayer using a permanent external magnetic field and a radially moveable focused laser light beam whose intensity is pulsed in accordance with the information to be written. Use of this means necessitates prior erasure of existing information in that region of the recording multilayer where the new information is to be written.

A known means of directly writing new information over existing information (so-called direct overwrite) employs a technique referred to as magnetic field modulation (MFM), whereby the intensity of the radially moveable focused laser light beam is constant and the direction of the external magnetic field is modulated in accordance with the information to be written, the magnetic field being supplied by an electromagnetic coil. However, a disadvantage of MFM is that, at high writing frequencies, the current in the electromagnetic coil must be switched very rapidly, and the required switching power is thus high. Another disadvantage of MFM is that, if it is employed with double-sided recording media which are protected on both faces by a glass or plastic plate, the presence of the plate increases the distance from the electromagnetic coil to the recording multilayer, thus reducing the on-site magnetic field strength in the recording multilayer, thereby necessitating a larger electrical current in the coil in order to counteract this effect. Application of MFM in compact devices with relatively small power supplies, such as "disc-man" players and portable computers, can thus be problematic.

A magneto-optical recording medium as described in the opening paragraph is known from European Patent Specification EP-B-304873, in which the recording multilayer consists of layers of Co alternately stacked with non-magnetic layers comprising a metal selected from the group formed by Pt and Pd. Important properties of such a recording multilayer are its saturation magnetisation, Curie temperature, coercive field, nucleation field, remanence, and magneto-optical Kerr effect. These properties can be influenced in a number of ways, such as variation of the thicknesses of the Co layers and the non-magnetic layers, variation of the total number of constituent layers in the recording multilayer, or variation of the technique used to create the recording multilayer. Specific combinations of these variable parameters have been shown to yield recording multilayers which have concurrent desirable properties such as a relatively large magneto-optical Kerr effect, 100% remanence, and a ratio of the values of the coercive field and nucleation field which results in a so-called "square" magnetic hysteresis loop.

However, a limitation of the known recording medium concerns its maximum density of information storage. When light of wavelength $\lambda$ is focused into a spot by a lens, diffraction effects place a fundamental lower limit on the width of the spot obtained. For a circular lens of diameter $\Delta$ and focal length f, the focused light forms a diffraction pattern consisting of a central bright disc (so-called Airy disc) surrounded by concentric dark and bright circular rings. The diameter $\delta$ of this Airy disc is given by the formula:

$$\delta = 1.22 \lambda \left( \frac{f}{\Delta} \right) \tag{1}$$

This is the minimum width of the light spot formed on the recording medium by a focused light beam. Because magneto-optical effects monitored in the reflected or transmitted light will be proportional to the net magnetisation value for this entire spot, it is evident that the width of the individual magnetised domains representing stored data bits will have a practical lower limit given by Equation (1). This limits the maximum density of information storage of the recording medium.

It is an object of the invention to provide a so-called super-resolution magneto-optical recording medium, in which the maximum storage density is considerably higher than in the known recording medium.

It is a further object of the invention to provide a magneto-optical recording medium into which data bits can be written according to a simple direct overwrite procedure which does not involve magnetic field modulation.

According to the invention, these and other objects, as will become apparent from the description below, are achieved in a magneto-optical recording medium as described in the opening paragraph, characterised in that at least one of the layers of the second kind which is bounded on both sides by layers of the first kind is substituted by a coupling structure comprising at least one layer of antiferromagnetic coupling material, across which coupling structure the immediately adjacent layers of the first kind are antiferromagnetically coupled.

A great advantage of such a magneto-optical recording medium is that, in general, the temperature dependence of the antiferromagnetic (AF) coupling across the coupling structure will be different to the temperature dependence of the magnetisation in the rest of the recording multilayer. This difference in temperature dependencies can be finely controlled and manipulated by proper adjustment of various parameters, including the thicknesses and chemical composition of the layers of the first and second kind, the constitution and chemical composition of the coupling structure, the means by which the various layers are deposited (e.g. vapour deposition or sputter deposition), and the conditions under which deposition takes place (e.g. choice of sputter gas).

The invention is based upon the insight that the concurrent presence of ferromagnetic and antiferromagnetic coupling, together with the different temperature dependencies of the AF coupling and magnetisation, can be exploited to produce a recording medium employing mechanisms for data recording and data reading which are different to those employed in the known recording medium.

It should be observed that there is another class of magneto-optical recording media in which coupling of various layers is exploited to allow super-resolution data storage and direct overwrite recording. These media, which demonstrate perpendicular magnetic anisotropy, employ amorphous alloys of rare earth (RE) elements and transition metal (TM) elements, as described for example in United Kingdom Patent Application GB-A-2077065. Such RE-TM alloy media generally comprise at least two relatively thick RE-TM alloy layers, stacked directly on top of one another. Commonly used RE-TM alloys include TbFeCo and GdTbFe, and typical layer thicknesses are of the order of 100 nm. Each of the alloy layers is ferrimagnetic, and the degree of ferrimagnetism is controlled by the exact compositions of the RE-TM alloys. In common embodiments, these compositions are thus chosen that the two layers are directly AF coupled. However, because this AF coupling is not mediated by an interposed coupling structure such as that characterising the present invention, there is comparatively little scope for independent adjustment of the temperature dependencies of the AF coupling and magnetisation, since both quantities are controlled by only one parameter, namely the RE-TM alloy composition. Controlled adjustment of temperature dependencies is important for the realisation of optimised practical embodiments of the magneto-optical recording medium according to the invention, as will become evident from discussion of the embodiments hereafter.

The known RE-TM alloy media have a number of additional disadvantages. First, unlike the magneto-optical recording media according to the invention, they are very sensitive to corrosion and oxidation, which can gradually change their magnetic and magneto-optical properties. Secondly, to minimise the effects of such oxidation, each RE-TM layer is made relatively thick (circa 100 nm). In this way, the proportion of unoxidised material in the bulk of the layer is relatively large in relation to the proportion of oxidised material at the surfaces of the layer, thus effectively minimising the effects of oxidation. However, heating thick layers requires a larger (laser) light intensity than heating thin layers, so that this measure increases the power required to write data into the medium. Thirdly, in manufacturing processes, it is relatively difficult to accurately maintain a critical RE-TM alloy composition combining the required values of the coercive field, nucleation field, magnetisation, remanence, magneto-optical Kerr effects, Curie temperature and AF coupling strength.

In the magneto-optical recording medium according to the invention, the layers of the first kind may contain extra materials in addition to pure Co. These extra materials can serve to alter the physical or chemical properties of the layers in which they are incorporated, or to influence the properties of neighbouring layers. For example, it can be shown that incorporation of 3–8 at. % Os or Re into the Co layers of the recording medium according to the invention causes a lowering of the Curie temperature and magnetisation of those layers. Similar effects can be achieved when the Co layers contain minority W, Nb, Ta or Mo substituents. Alternatively, the layers of the first kind can comprise a CoNi alloy which is principally comprised of Co, e.g. a $Co_{60}Ni_{40}$ alloy. It is stressed that the invention does not require all the layers of either the first kind or the second kind to have identical compositions or thicknesses, or to be provided by the same means. For example, the layers of the first kind at one side of the coupling structure may have different compositions and thicknesses to the layers of the first kind at the other side of the coupling structure. Additionally, consecutive layers of the second kind may comprise different materials, and have different thicknesses, and be deposited by different means or under different conditions.

A preferential embodiment of the magneto-optical recording medium according to the invention is characterised in that the antiferromagnetic coupling material is selected from the group formed by V, Cr, Mn, Cu, Nb, Mo, Ru, Rh, Ta, W, Re, Os, Ir, and mixtures thereof. When interposed between Co layers in a multilayer, an appropriately thick layer comprising one of these materials has been found to induce strong AF coupling of the Co layers immediately adjacent to it. In addition, it has been observed that the strength and sign of the coupling across an interposed layer comprising one of these materials demonstrates an oscillatory dependence on the thickness of that layer, thus allowing the strength of the AF coupling to be tailored to the desired performance and requirements of a particular multilayer via careful choice of the thickness of the layer of antiferromagnetic coupling material.

A particularly advantageous embodiment of the magneto-optical recording medium according to the invention is characterised in that the coupling structure is a single layer of antiferromagnetic coupling material selected from the group formed by Rh, Ru, and mixtures thereof, which layer has a thickness in the range 0.5 nm–1.2 nm. Of the elements V, Cr, Mn, Cu, Nb, Mo, Ru, Rh, Ta, W, Re, Os and Ir listed above, Rh demonstrates the largest AF coupling strength, and Ru demonstrates the second largest AF coupling strength. The magnitude and sign of the coupling across these two materials oscillates as a function of the Rh or Ru layer thickness, demonstrating a peak at approximately 0.8 nm. Above 1.2 nm, the coupling begins to demonstrate a ferromagnetic character. Below 0.5 nm, the coupling becomes weakly antiferromagnetic, or ferromagnetic.

Another preferential embodiment of the magneto-optical recording medium according to the invention is characterised in that the coupling structure further contains at least one layer of ferromagnetic material selected from the group formed by Fe, Ni, Co, and mixtures thereof. As already stated, the presence of an interposed coupling structure according to the invention advantageously facilitates adjustment of the temperature dependence and effective strength of the AF coupling in the recording multilayer. Such temperature dependence and effective strength can be influenced not only by the choice of chemical composition and thickness of the layer of antiferromagnetic coupling material, but also by the presence of at least one layer of ferromagnetic material in the coupling structure, the thickness of which also influences the aforementioned temperature dependence and effective strength.

In addition to the layer of antiferromagnetic coupling material, and any optionally present ferromagnetic material, the coupling structure can also contain layers of other materials, which are, for example, incorporated in the structure so as to influence its magnetic, magneto-optical, optical, thermal or chemical properties, or solely for the purpose of adjusting the thickness of the coupling structure so as to influence the strength of the AF coupling across it or the penetration depth of light within it. Examples of such other materials are Pd, Pt, Au, and mixtures thereof.

Possible embodiments of the coupling structure in a magneto-optical recording medium according to the invention therefore include:

(a) a single Rh layer sandwiched between two Ni layers, or (b) a single Fe layer sandwiched between a Pd layer on one side and a Ru layer on the other side, or (c) a single Fe layer sandwiched between a Rh layer on one side and a Ru layer on the other side, or (d) a stack of five layers, each containing a given element, namely Pd, Fe, Ru, Ni and Pt, consecutively, for specific thickness ranges of the various layers.

This list of four possible embodiments is given by way of example only, and is obviously not exhaustive.

A further advantageous embodiment of the magneto-optical recording medium according to the invention is characterised in that the layers of the second kind contain a material selected from the group formed by Ni, Pd, Pt, Au, and mixtures thereof. Experiment has demonstrated that Co/Ni, Co/Pd, Co/Pt and Co/Au interfaces all demonstrate particularly large positive surface anisotropies (i.e. strong perpendicular magnetisation). Attractive magneto-optical recording properties of multilayers in which layers of Co are alternately stacked with layers of Ni are discussed at length by den Broeder et al. in Appl. Phys. Lett. 61 (12), pages 1468–1470 (1992). In the case of multilayers combining Co layers with interposed Pd or Pt layers, advantageous magneto-optical recording properties are summarised by Zeper et al. in J. Appl. Phys. 70 (4), pages 2264–2271 (1991). A particular advantage in the case of such Co/Pd and Co/Pt multilayers is that the magnitudes of their magneto-optical Kerr effects increase with decreasing wavelength, making these multilayered materials particularly suitable for recording at short optical wavelengths (blue light), at which wavelengths the maximum density of information storage is higher than at commonly employed red wavelengths (see Equation (1)). In the case of Co/Pt interfaces, experiment has shown that the Pt layer becomes magnetically polarised by the Co layer in such a manner that the total magneto-optical Kerr effect of the combined layers substantially exceeds that of the Co layer alone. In contrast, the magneto-optical Kerr effect of Co/Au layered structures is relatively small, and this property is of virtue when it is desired that a given part of the recording multilayer should demonstrate a smaller magneto-optical Kerr effect than another given part thereof, as will be discussed hereafter.

A preferred rendition of the magneto-optical recording medium according to the invention, particularly suitable for so-called super-resolution data storage, is characterised in that the embodiment of that part $P_1$ of the recording multilayer at one side of the coupling structure, and of that part $P_2$ of the recording multilayer at the other side of the coupling structure, is such that a first magnetic switching field $H_{s1}$, for switching magnetisations in part $P_1$ out of anti-parallel orientation with respect to corresponding magnetisations in part $P_2$ and into parallel orientation with respect thereto, is lower than a second magnetic switching field $H_{s2}$, for switching magnetisations in part $P_2$ out of anti-parallel orientation with respect to corresponding magnetisations in part $P_1$ and into parallel orientation with respect thereto. This stipulation can be expressed in formula form as follows:

$$H_{s1} < H_{s2} \qquad (2)$$

The term "corresponding magnetisations in part $P_2$" is intended to denote those magnetisations in part $P_2$ which are located within the same data bit domain as the relevant magnetisations in part $P_1$, and vice versa. If AF coupling strength across the coupling structure is denoted by J, magnetic permeability of vacuum is denoted by $\mu_0$, saturation magnetisation of a given part is denoted by $M_s$, cumulative ferromagnetic layer thickness of a given part is denoted by t, and coercive field of a given part is denoted by $H_c$, then the following equations can be derived in SI units:

$$H_{s1} = \left( \frac{-2J}{\mu_0 M_s t} + H_c \right)_1 \qquad (3)$$

$$H_{s2} = \left( \frac{-2J}{\mu_0 M_s t} + H_c \right)_2 \qquad (4)$$

whereby it is assumed that J is negative for AF coupling. In each of these equations, the expression between parentheses is intended to be evaluated for that part of the recording multilayer which is indicated by the particular subscript outside those parentheses, whereby the subscript "1" refers to part $P_1$ and the subscript "2" refers to part $P_2$.

It is of additional advantage in this case when the parts $P_1$ and $P_2$ are thus embodied, by suitable choice of parameters as already discussed, that the following conditions are met:

(i) A third magnetic switching field $H_{s3}$, for switching magnetisations in part $P_1$ out of parallel orientation with respect to corresponding magnetisations in part $P_2$ and into anti-parallel orientation with respect thereto, is larger than a fourth magnetic switching field $H_{s4}$, for switching magnetisations in part $P_2$ out of parallel orientation with respect to corresponding magnetisations in part $P_1$ and into anti-parallel orientation with respect thereto. This stipulation can be expressed in formula form as follows:

$$H_{s3} > H_{s4} \qquad (5)$$

Using the notation and sign convention introduced above, the following equations can be derived in SI units:

$$H_{s3} = \left( \frac{-2J}{\mu_0 M_s t} - H_c \right)_1 \qquad (6)$$

$$H_{s4} = \left( \frac{-2J}{\mu_0 M_s t} - H_c \right)_2 \qquad (7)$$

In each of these equations, the expression between parentheses is intended to be evaluated for that part of the recording multilayer which is indicated by the particular subscript outside those parentheses, whereby the subscript "1" refers to part $P_1$ and the subscript "2" refers to part $P_2$.

(ii) In the absence of an external magnetic field, the only stable magnetisation configurations in parts $P_1$ and $P_2$ are those whereby magnetisations in part $P_1$ are oppositely oriented to corresponding magnetisations in part $P_2$. This requires that:

$$H_{s3} > 0 \qquad (8)$$

(iii) The temperature dependence of the AF coupling strength is stronger than that of the magnetisation in either of the parts $P_1$ or $P_2$, i.e. the decrease of J with increasing temperature is stronger than the corresponding decrease of the magnetisation in either part of the recording multilayer.

(iv) The Curie temperature $T_{c2}$ of part $P_2$ is higher than the Curie temperature $T_{c1}$ of part $P_1$.

(v) The (laser) light beam employed in writing data to and reading data from the recording medium enters the recording multilayer via part $P_1$, and then impinges on part $P_2$.

Since the intensity of a light beam incident on such a recording multilayer through the part $P_1$ (for example) demonstrates an exponential decay as a function of the penetration depth into the medium, the individual magneto-optical contributions of the successively encountered layers to the total magneto-optical effect from the entire recording multilayer will thus diminish as a function of penetration depth. However, adjustment of the absolute magneto-optical effect of part $P_2$ to be larger than that of part $P_1$ counteracts this effect, and, for a chosen wavelength of light, sufficiently accurate choice of chemical composition, deposition conditions, layer thicknesses and numbers of repetitions in the two parts will ensure an almost perfect counteraction, whereby the magnitude of the relative magneto-optical contribution from part $P_2$ will equal that from part $P_1$, as seen from the side of $P_1$ remote from the coupling structure. Since parts $P_2$ and $P_1$ are located at opposite sides of the coupling structure across which the immediately adjacent layers of the first kind are antiferromagnetically coupled, and since, within each part, the layers of the first kind are ferromagnetically coupled to one another, it follows that part $P_2$ as a whole can be antiferromagnetically coupled to part $P_1$ as a whole. This antiferromagnetic coupling will cause the sign of the magneto-optical effect from part $P_2$ to be opposite to that from part $P_1$. Since the magnitudes of the relative magneto-optical contributions from the two parts are equal (for the chosen wavelength of light), it follows that the total net magneto-optical effect from the recording multilayer will therefore be zero, as seen from the side of $P_1$ remote from the coupling structure.

If the coupling structure is locally heated using a focused (laser) light beam of the chosen wavelength, the strength of the AF coupling across the region of the coupling structure thus heated will diminish. If the intensity of the light beam is such that the temperature within the heated region remains below the Curie temperatures of the parts $P_1$ and $P_2$, then the AF coupling can be weakened without substantially weakening the magnetisation of these individual parts. Due to the validity of Formula (2), an external magnetic field (the so-called reading field), which is weaker than $H_{c1}$ at room temperature, can then be employed to overwhelm any remaining AF coupling and force the magnetisations in part $P_1$ to become parallel to the magnetic field, whilst leaving those in part $P_2$ unchanged. In this way, the net magneto-optical effect from the recording multilayer will become non-zero for domains in which the magnetisation in part $P_2$ was already parallel to the external magnetic field. In addition to its dependence on the chemical composition of the recording multilayer, the thermal behaviour of the AF coupling is dependent on the microstructure of the coupling structure, and this microstructure is in turn dependent on the means used to deposit the coupling structure (such as sputtering deposition or vacuum vapour deposition) and on the conditions under which deposition takes place (such as the choice of sputter gas). With a suitable choice of chemical composition and deposition conditions, and appropriate choice of the intensity of the focused light beam, one can thus exploit the Gaussian distribution of intensity within the Airy disc of the focused light beam to guarantee that, in relation to the fixed magnitude of the reading field, sufficient thermal weakening of the AF coupling across the coupling structure only occurs in a small central region of the Airy disc. Outside this small central region, corresponding magnetisations in parts $P_1$ and $P_2$ remain oppositely oriented, since remaining AF coupling cannot be overwhelmed by the fixed reading field, and the net magneto-optical effect will thus be zero. The size of the spot from which a magneto-optical effect is obtained is therefore smaller than the Airy disc.

Data bits can be written into such a recording multilayer in a manner which resembles that used to write data bits into the known recording medium. For example, using a focused light beam, part $P_2$ at least is locally heated to a temperature near its Curie temperature. By carefully choosing the intensity of the light beam, the Gaussian distribution of intensity within the Airy disc of the focused light spot can be exploited to ensure that only a small central region of the Airy disc is heated to a temperature near this Curie temperature. Using an external magnetic field, the magnetisation in part $P_2$ within the heated region is forced into a direction parallel to the magnetic field, being one of two orientations perpendicular to the plane of the medium. Cooling the heated region allows the magnetisation in part $P_1$ of the same region to adopt an anti-parallel orientation with respect to the locked magnetisation in part $P_2$ of that region, as AF coupling across the coupling structure strengthens. In this way, the individual magnetisations in part $P_1$ each correspond to oppositely directed magnetisations in part $P_2$, so that the total summed magneto-optical contribution of the combined parts is zero. However, the individual magnetisations in part $P_2$ still represent data bits, by virtue of their individual orientations. The size of each data bit is smaller that the Airy disc of the employed light beam, thus yielding a maximum density of information storage which exceeds that of the known recording medium, in accordance with one of the stated objects of the invention.

Data bits which have been written into such a recording multilayer can be read therefrom by virtue of the principle introduced in the penultimate previous paragraph. Once the AF coupling between parts $P_1$ and $P_2$ has been thermally weakened by a light beam of the chosen wavelength, an external magnetic field of accurately chosen magnitude can be employed to force the individual magnetisations in part $P_1$ into a single orientation parallel to the field, whilst leaving the orientations of the magnetisations in part $P_2$ unchanged. This selective manipulation of magnetisations is made possible by the validity of Formula (2) for the embodiment in question. Magnetisations in part $P_1$ will align themselves in the same direction as the external magnetic field, whereas the magnetisations in part $P_2$ will retain their initial orientation. If, within a given single data bit domain of the recording medium, the magnetisations in part $P_2$ happen to have the same orientation as the external magnetic field, then all magnetisations within that data bit domain will be parallel, giving a non-zero magneto-optical effect. If, however, the magnetisations in part $P_2$ of that data bit domain happen to have an orientation opposite to that of the external magnetic field, then, since the magnetisations in part $P_1$ of the same region have the same orientation as the magnetic field, the total summed magneto-optical effect from that region will be zero. In this way, using an external magnetic field of fixed direction and accurately chosen magnitude, it is possible to unambiguously distinguish between data bits represented by each of the two possible orientations of the magnetisations in part $P_2$.

A preferred rendition of the magneto-optical recording medium according to the invention, particularly suitable for direct overwrite recording without the use of magnetic field modulation, is characterised in that parts $P_1$ and $P_2$ of the recording multilayer are thus embodied that $H_{s1}<H_{s2}$, and that the following two relationships hold:

$$H_{s3}<0 \qquad (9)$$

$$T_{c1}>T_{c2} \qquad (10)$$

It is of additional advantage in this case when the parts $P_1$ and $P_2$ are thus embodied, by suitable choice of parameters as already discussed, that the following conditions are met:

(I) Formula (5) is valid, i.e. $H_{s3}>H_{s4}$.

(II) The AF coupling across the coupling structure demonstrates a relatively weak temperature dependence.

(III) The (laser) light beam employed in writing data to the recording medium enters the recording multilayer via part $P_2$, and then impinges on part $P_1$.

A direct overwrite method which does not involve MFM and which can be employed with such an embodiment of the magneto-optical recording medium according to the invention will now be elucidated. The method employs two oppositely oriented external magnetic fields, and a (laser) light beam whose intensity is modulated according to the data to be written. One of the external magnetic fields, called the initialising field ($H_I$), can be activated so as to force all magnetisations in part $P_1$ of a given region of the recording multilayer into a single lasting orientation, without assistance from the light beam and without changing the orientation of magnetisations in part $P_2$ of that region. This selective manipulation of magnetisations (the so-called initialisation process) is made possible by the validity of Formula (2) for this embodiment, and the stability of the initialised magnetisation state is due to the validity of Formula (9). Subsequently, the second external magnetic field, called the bias field ($H_B$), is used in conjunction with the modulated light beam to write the new data bits in that same region of the recording multilayer, now initialised. The essence of this writing procedure, within a given data bit domain of the region in question, is as follows:

(A) Thermomagnetic orientation of magnetisations in part $P_2$ to be anti-parallel to the corresponding initialised magnetisations in part $P_1$ requires a relatively low (laser) light intensity. Thanks to the validity of Formula (10) for this embodiment, this first light intensity can be chosen so as to thermally demagnetise part $P_2$ to a greater extent than part $P_1$. As the heated domain is subsequently allowed to cool, the AF coupling locks the thermally weakened magnetisations in part $P_2$ into an anti-parallel orientation with respect to the (less-weakened) initialised magnetisations in part $P_1$.

(B) Thermomagnetic reversal of initialised magnetisations in part $P_1$, with attendant anti-parallel aligning of the corresponding magnetisations in part $P_2$, requires a higher (laser) light intensity than is necessary in case (A), since Formula (10) now requires the domain to be heated to a higher temperature than in case (A). Once the magnetisations in part $P_1$ have been thermally weakened to the required extent, the domain is allowed to cool. The magnetisations in part $P_1$ will then first lock themselves parallel to $H_B$, and the magnetisations in part $P_2$ will later align themselves anti-parallel to the magnetisations in part $P_1$, due to the AF coupling.

This embodiment of the magneto-optical recording medium, suitable for direct overwrite recording, can also be used for super-resolution data storage, since supplementary condition (v) for super-resolution (stated above) is not essential. In this case, supplementary condition (ii) for super-resolution (stated above) must be abandoned, since it is at variance with Formula (9), whence two initialising magnetic fields are required instead of one.

Practical and advantageous materials from which the substrate can be manufactured include glass, quartz, and synthetic resins such as polymethylmethacrylate and polycarbonate. Apart from the substrate and recording multilayer, the recording medium can also comprise additional layers which improve the performance of the recording medium as a whole. Examples of such additional layers are:

A photo-polymerised layer of, for example, a UV-cured photolacquer. Such a layer can, for example, be deposited directly on the substrate, and can be provided during curing with a servo track (guide groove) along which individual data bits can be written. An advantageous form for this servo track is a spiral curve which winds gradually outward from the centre of a circular disc. In the case of a substrate manufactured from a synthetic resin, a guide track can be provided directly in the substrate itself;

A dielectric enhancement layer of a material such as AlN or $Si_3N_4$. Such a layer serves to artificially enhance the Kerr rotation of the recording multilayer;

A reflector layer of a highly reflective metal such as Au, Ag, Al or Cu. The presence of such a layer can improve the overall reflectivity of the recording medium with respect to the light beam employed to read data bits therefrom;

A protective layer of, for example, a spin-coated UV-cured photolacquer.

The invention and its attendant advantages will be further elucidated with the aid of embodiments and the accompanying drawings, whereby:

EMBODIMENT 1

Figure 1:
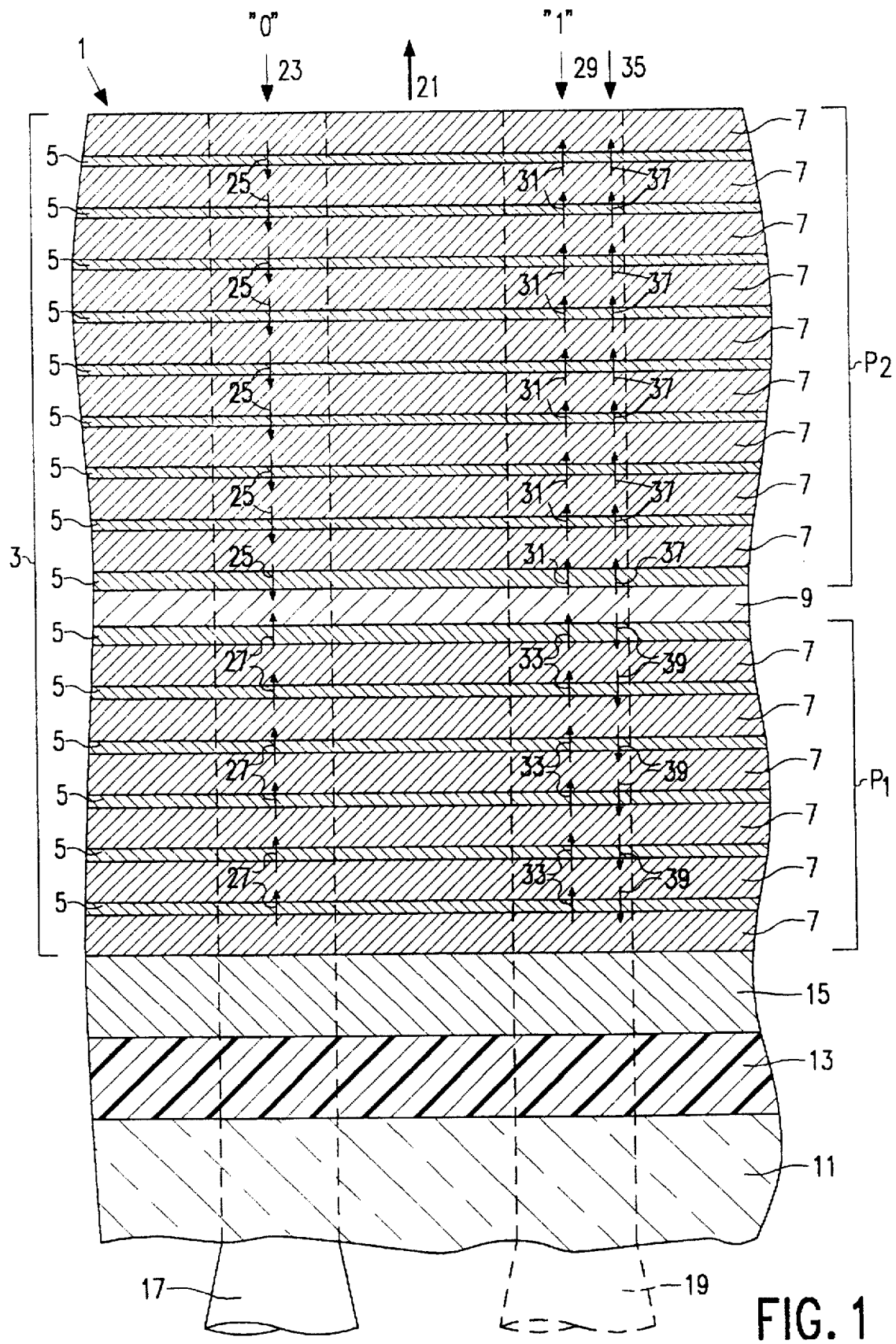
FIG. 1 is a schematic representation of part of a cross section of a particular magneto-optical recording medium according to the invention.

FIG. 1 is a schematic representation of part of a cross section of a particular magneto-optical recording medium 1 according to the invention.

The figure depicts a recording multilayer 3 comprising an alternating stack of layers of a first kind 5 and layers of a second kind 7, in which a coupling structure 9 is substituted for one of the layers of the second kind 7. The coupling structure 9 comprises a Ru layer of thickness 0.9 nm, and divides the recording multilayer 3 into two parts $P_1$ and $P_2$. In both parts $P_1$ and $P_2$, the layers of the first kind 5 comprise Co, and the layers of the second kind 7 comprise Pt. In part $P_1$, the Co layer 5 immediately adjacent to the Ru layer 9 has a thickness of 0.45 nm, each of the remaining five Co layers 5 has a thickness of 0.31 nm, and each of the six Pt layers 7 has a thickness of 1.0 nm. In part $P_2$, the Co layer 5 immediately adjacent to the Ru layer 9 has a thickness of 0.45 nm, each of the remaining eight Co layers 5 has a thickness of 0.26 nm, and each of the nine Pt layers 7 has a thickness of 1.0 nm. The thicknesses of the Co layers 5 are such that they all exhibit perpendicular magnetic anisotropy (i.e. magnetisation perpendicular to the plane of each layer 5, and a positive value of the total effective anisotropy), and that Formula (2) is valid for this embodiment.

The figure also depicts a glass substrate 11, which is spin-coated with a UV-cured photolacquer layer 13 and a dielectric enhancement layer 15 of AlN. Part $P_1$ of the recording multilayer 3 is vapour-deposited directly onto this dielectric enhancement layer 15, with subsequent vapour-deposition of layer 9 and part $P_2$.

Also schematically depicted are two focused (laser) light beams 17, 19 of equal diameter, wavelength and intensity. These light beams impinge upon the recording multilayer 3 via the substrate 11, and illuminate two distinct data bit domains of the recording multilayer 3. An external magnetic field 21 (the reading field) is applied concurrent to illumination of the medium 1 by the light beams 17, 19. Although two light beams 17, 19 are drawn for illustrative purposes, only one light beam is actually required to read data from the medium, or to write data into the medium.

To read existing data bits from the recording multilayer 3, a focused light beam (such as light beam 17 or 19) is employed to thermally weaken the AF coupling across layer 9 within a given domain, without causing substantial thermal demagnetisation of the parts $P_1$ and $P_2$. Under these circumstances, the strength of the magnetic field 21 is thus chosen that it can be used to change the orientations of the magnetisations in part $P_1$ of the heated domain without disturbing the magnetisations in part $P_2$ thereof. A condition for this selective manipulation of magnetisations is that Formula (2) be valid for this embodiment.

In the case of the data bit domain 23 illuminated by the central region of light beam 17, the magnetisations 25 in part $P_2$ are anti-parallel to the magnetic field 21, whereas the magnetisations 27 in part $P_1$ are parallel to the magnetic field 21, so that the total magneto-optical effect from the domain 23 is zero. On the other hand, in the case of the data domain 29 illuminated by the central region of light beam 19, the magnetisations 31 in part $P_2$ are parallel to the magnetic field 21, and the magnetisations 33 in part $P_1$ are reversed by the magnetic field 21 so as to be parallel to it, so that the total magneto-optical effect from the domain 29 is non-zero. These considerations justify the labels "0" and "1" used in FIG. 1 to denote the respective data bit domains illuminated by the light beams 17, 19.

The width of the light beams 17, 19 schematically represents the diameter of the Airy disc for the chosen wavelength. The two data bit domains discussed above are each situated within a small central region of this Airy disc, and the intensity of light beams 17, 19 is thus chosen that sufficient thermal weakening of the AF coupling across layer 9 only occurs within this small central region of each Airy disc. For illustrative purposes, an additional data bit domain 35 is represented at the edge of the Airy disc of light beam 19. For this data bit domain 35, the magnetisations 37 in part $P_2$ are oriented parallel to the magnetic field 21, but the AF coupling across layer 9 is insufficiently thermally weakened by the light beam 19 to allow reversal of any of the magnetisations 39 in part $P_1$ by the magnetic field 21. The magnetisations 39 in part $P_1$ therefore remain oppositely oriented to the magnetisations 37 in part $P_2$, so that the total magneto-optical effect in this domain is zero. It is thus seen that, at any one time, only data bit domains within a small central region of the light beam can be read.

EMBODIMENT 2

Figure 2:
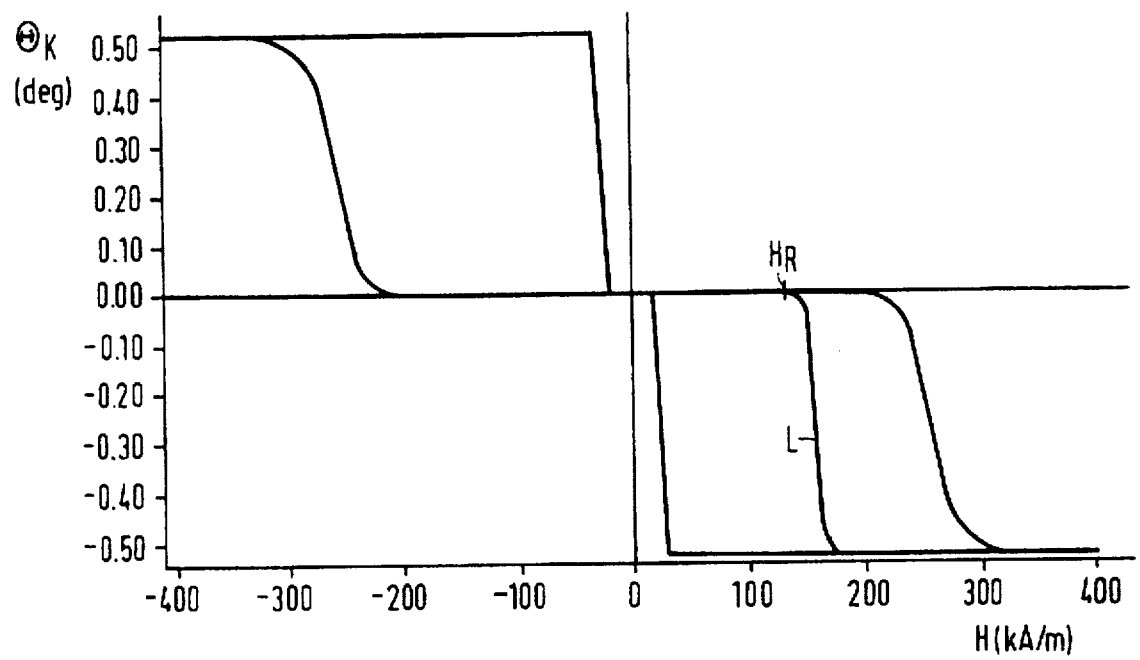
FIG. 2 shows a magnetic hysteresis loop measured at room temperature and at a wavelength of 633 nm for the particular embodiment of the magneto-optical recording medium depicted in FIG. 1.

FIG. 2 shows a magnetic hysteresis loop measured at room temperature for the particular embodiment of the magneto-optical recording medium detailed in Embodiment 1 and FIG. 1. The depicted hysteresis loop is a graph of polar magneto-optical Kerr rotation $\Theta_K$ (in degrees) as a function of external polar magnetic field H (in kA/m), whereby the recording medium was irradiated via the substrate using a HeNe gas laser of wavelength 633 nm. At zero external magnetic field, the Kerr rotation is zero, since the relative Kerr rotation contributions from parts $P_1$ and $P_2$ are equal in magnitude but opposite in sign, and thus cancel one another. At external magnetic fields in excess of 350 kA/m, the Kerr rotation has a relatively large value in excess of 0.5 degrees, since the relative Kerr rotation contributions from parts $P_1$ and $P_2$ are equal in magnitude and equal in sign, and thus reinforce one another. The hysteresis loop includes an inner loop L, and a reading field $H_R$ is also depicted.

EMBODIMENT 3

Figure 3:
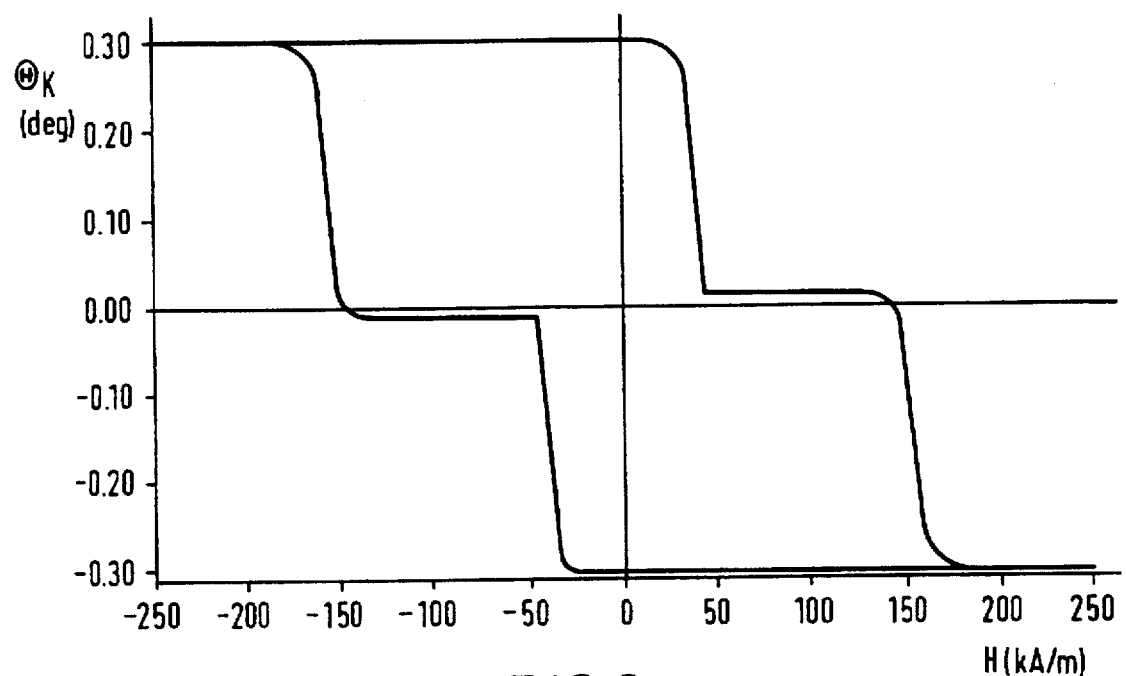
FIG. 3 depicts a magnetic hysteresis loop measured at room temperature and at a wavelength of 820 nm for a particular embodiment of the magneto-optical recording medium according to the invention, in which embodiment the coupling structure is a stack of five layers, each containing a given element, namely Pt, Fe, Ru, Fe, Pt, consecutively.

FIG. 3 shows a magnetic hysteresis loop measured at room temperature for a particular embodiment of the magneto-optical recording medium according to the invention, whereby the coupling structure consists of a Pt/Fe/Ru/Fe/Pt layered stack. The depicted hysteresis loop is a graph of polar magneto-optical Kerr rotation $\Theta_K$ (in degrees) as a function of external polar magnetic field H (in kA/m), whereby the recording medium was irradiated via the substrate using a solid state semiconductor laser of wavelength 820 nm.

The recording multilayer in this embodiment has the following structure:

Each layer of the first kind comprises Co, and is 0.31 nm thick;

Each layer of the second kind comprises Pt, and is 1.0 nm thick;

The first layer to be deposited on the glass substrate is a Pt layer, followed by a Co layer. Pt and Co layers are subsequently stacked in alternate arrangement until a total of five of each has been deposited. The stack thus ends with a Co layer;

The coupling structure is subsequently deposited. This is a symmetric structure consisting of 5 layers, each of a single chemical element, namely Pt, Fe, Ru, Fe and Pt, consecutively. The respective thicknesses of the layers are 1.0, 0.45, 0.9, 0.45 and 1.0 nm;

The coupling structure is covered by a Co layer, followed by a Pt layer. Co and Pt layers are subsequently stacked in alternate arrangement until a total of eight of each has been deposited. The stack thus ends with a Pt layer. An additional protective layer was not necessary.

The thicknesses and pluralities of the various layers in the recording multilayer had not yet been optimised to yield zero total Kerr rotation (for the employed wavelength of 820 nm) at zero applied external field.

EMBODIMENT 4

FIG. 4 is a schematic representation of a direct overwrite principle which can be employed with a preferential embodiment of the magneto-optical recording medium 2 according to the invention and which does not involve magnetic field modulation.

Figure 4A:
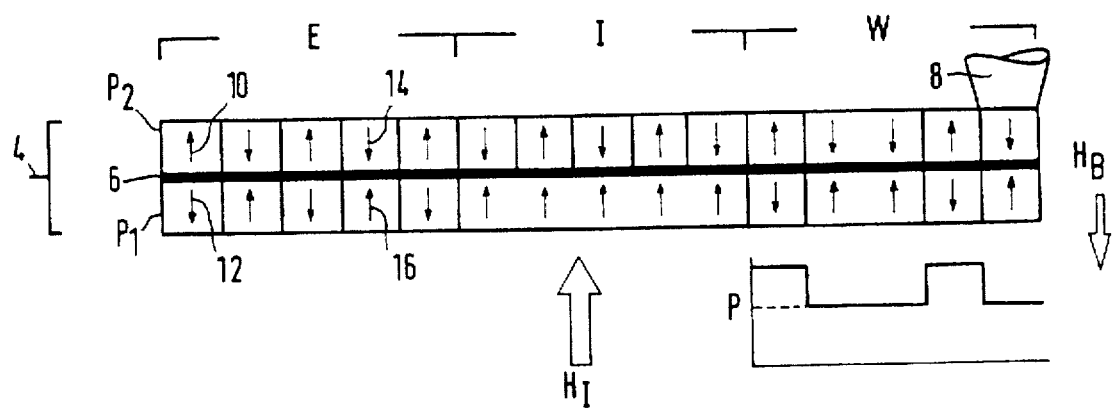
FIG. 4 is a schematic depiction of a direct overwrite principle which can be employed with a particular embodiment of the magneto-optical recording medium according to the invention.

FIG. 4(a) shows a cross section of part of a recording multilayer 4, which recording multilayer 4 is divided into parts $P_1$ and $P_2$ by a coupling structure 6. Also schematically depicted are an initialising magnetic field $H_I$ and a bias magnetic field $H_B$, which fields are oppositely oriented. A laser light beam 8 is used in conjunction with $H_B$ in the writing process.

The depicted part of the recording multilayer 4 is laterally divided into three schematic portions E, I and W, which respectively represent a portion E of existing data, a portion I which has been initialised for writing, and a portion W of newly written data. Within these portions, the arrows 10, 12 and 14, 16 schematically indicate the magnetisation directions in two different data bit domains of the recording multilayer 4. In the case of the portion W, a block graph shows relative values of the intensity P of the laser light beam 8 employed to write the corresponding data bit domains depicted above the graph.

Figure 4B:
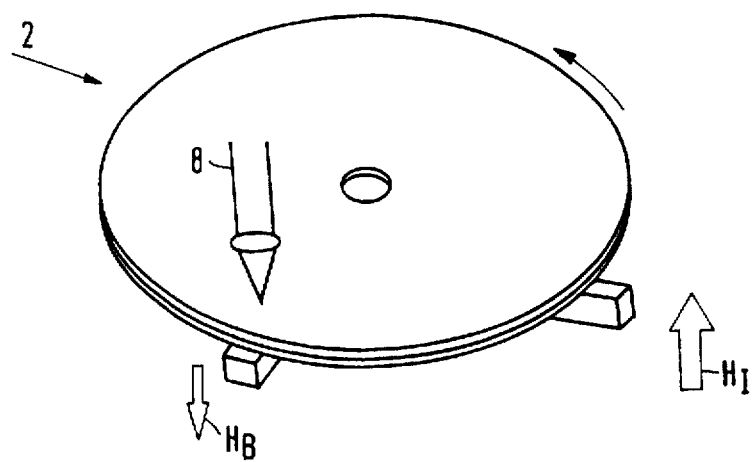

FIG. 4(b) shows a perspective view of a possible arrangement for direct overwrite of information into a rotatable disc-shaped magneto-optical recording medium 2 according to the invention, whereby use is made of the direct overwrite principle illustrated in FIG. 4(a).

We claim:

1. a magneto-optical recording medium comprising a substrate and a recording multilayer provided on said substrate, the recording multilayer having a magnetic easy axis perpendicular to the multilayer and comprising layers of a first kind alternately stacked with layers of a second kind, the layers of the first kind consisting essentially of Co and forming said magnetic easy axis with the layers of the first kind whereby successive layers of the first kind are ferromagnetically coupled across interposed layers of the second kind, wherein one of the layers of the second kind is substituted by a coupling structure comprising at least one layer of an antiferromagnetic coupling material, said coupling structure being provided on one side with a part $P_1$ of the recording multilayer and, at the other side, with a part $P_1$ of the recording multilayer, and in that the part $P_1$ of the recording multilayer at one side of the coupling structure and the part $P_2$ of the recording multilayer at the other side of the coupling structure are such that a first magnetic switching field, for switching magnetizations in part $P_1$ out of anti-parallel orientation with respect to corresponding magnetizations in part $P_2$ and into parallel orientations with respect thereto, is smaller than a second magnetic switching field, for switching magnetizations in part $P_2$ out of antiparallel orientation with respect to corresponding magnetizations in part $P_1$ and into parallel orientation with respect thereto.

2. A magneto-optical recording medium according to claim 1, wherein the antiferromagnetic coupling material is selected from the group consisting of V, Cr, Mn, Cu, Nb, Mo, Ru, Rh, Ta, W, Re, Os, Ir, and mixtures thereof.

3. Magneto-optical recording medium according to claim 2, wherein the coupling structure is a single layer of antiferromagnetic coupling material selected from the group consisting of Rh, Ru, and mixtures thereof, which layer has a thickness in the range 0.5 nm–1.2 nm.

4. A magneto-optical recording medium according to claim 1, wherein the coupling structure further contains at least one layer of ferromagnetic material selected from the group consisting of Fe, Ni, Co, and mixtures thereof.

5. A magneto-optical recording medium according to claim 1, wherein the layers of the second kind contain a material selected from the group consisting of Ni, Pd, Pt, Au, and mixtures thereof.

6. A magneto-optical recording medium of claim 1 wherein parts $P_1$ and $P_2$ are such that the Curie temperature of Part $P_1$ is greater than Part $P_2$ and a third magnetic switching field, for switching magnetizations in part $P_1$ out of parallel orientation with respect to corresponding magnetizations in part $P_2$ and into antiparallel orientation with respect thereto, is larger than a fourth magnetic switching field, for switching magnetizations in part $P_2$ out of parallel orientation with respect to corresponding magnetizations in part $P_1$ and into anti-parallel orientation with respect thereto.

7. A magneto-optical recording medium as claimed in claim 2 wherein the coupling structure further contains at least one layer of ferromagnetic material selected from the group consisting of Fe, Ni, Co, and mixtures thereof.

8. A magneto-optical recording medium as claimed in claim 3 wherein the coupling structure further contains at least one layer of ferromagnetic material selected from the group consisting of Fe, Ni, Co, and mixtures thereof.

9. A magneto-optical recording medium as claimed in claim 2 wherein the layers of the second kind contain a material selected from the group consisting of Ni, Pd, Pt, Au, and mixtures thereof.

10. A magneto-optical recording medium as claimed in claim 3 wherein the layers of the second kind contain a material selected from the group consisting of Ni, Pd, Pt, Au, and mixtures thereof.

11. A magneto-optical recording medium as claimed in claim 4 wherein the layers of the second kind contain a material selected from the group consisting of Ni, Pd, Pt, Au, and mixtures thereof.

12. A magneto-optical medium according to claim 2, characterized in that the composition of part $P_1$ of the recording multilayer at one side of the coupling structure and the composition of part $P_2$ of the recording layer at the other side of the coupling structure are such that a first magnetic switching field, for switching magnetizations in part $P_1$ out of antiparallel orientation with respect to corresponding magnetizations in part $P_2$ and into parallel orientations with respect thereto, is smaller than a second magnetic switching field, for switching magnetizations in part $P_2$ out of antiparallel orientation with respect to corresponding magnetizations in part $P_1$ and into, parallel orientation with respect thereto.

13. A magneto-optical medium according to claim 3, characterized in that the composition of part $P_1$ of the recording multilayer at one side of the coupling structure and the composition of part $P_2$ of the recording layer at the other side of the coupling structure are such that a first magnetic switching field, for switching magnetizations in part $P_1$ out of antiparallel orientation with respect to corresponding magnetizations in part $P_2$ and into parallel orientations with respect thereto, is smaller than a second magnetic switching field, for switching magnetizations in part $P_2$ out of antiparallel orientation with respect to corresponding magnetizations in part $P_1$ and into, parallel orientation with respect thereto.

14. A magneto-optical medium according to claim 4, characterized in that the composition of part $P_1$ of the recording multilayer at one side of the coupling structure and the composition of part $P_2$ of the recording layer at the other side of the coupling structure are such that a first magnetic switching field, for switching magnetizations in part $P_1$ out of antiparallel orientation with respect to corresponding magnetizations in part $P_2$ and into parallel orientations with respect thereto, is smaller than a second magnetic switching field, for switching magnetizations in part $P_2$ out of antiparallel orientation with respect to corresponding magnetizations in part $P_1$ and into, parallel orientation with respect thereto.

15. A magneto-optical medium according to claim 5, characterized in that the composition of part $P_1$ of the recording multilayer at one side of the coupling structure and the composition of part $P_2$ of the recording layer at the other side of the coupling structure are such that a first magnetic switching field, for switching magnetizations in part $P_1$ out of antiparallel orientation with respect to corresponding magnetizations in part $P_2$ and into parallel orientations with respect thereto, is smaller than a second magnetic switching field, for switching magnetizations in part $P_2$ out of antiparallel orientation with respect to corresponding magnetizations in part $P_1$ and into, parallel orientation with respect thereto.

* * * * *